(12) United States Patent
Chevalier et al.

(10) Patent No.: US 7,325,770 B2
(45) Date of Patent: Feb. 5, 2008

(54) MOUNTING OF ENGINE ONTO AN AIRCRAFT STRUCTURE

(75) Inventors: Lydie Marie Helene Chevalier, Lesigny (FR); Marc Patrick Tesniere, Champcueil (FR); Gabriel Noirclerc, Garches (FR)

(73) Assignee: Snecma Moteurs, Paris (FR)

( * ) Notice: Subject to any disclaimer, the term of this patent is extended or adjusted under 35 U.S.C. 154(b) by 296 days.

(21) Appl. No.: 11/073,646

(22) Filed: Mar. 8, 2005

(65) Prior Publication Data
US 2005/0269445 A1    Dec. 8, 2005

(30) Foreign Application Priority Data
Mar. 8, 2004 (FR) .................................. 04 02387

(51) Int. Cl.
*B64D 27/00* (2006.01)
(52) U.S. Cl. .......................................... 244/54; 244/55
(58) Field of Classification Search ............. 244/53 R, 244/54, 55, 56
See application file for complete search history.

(56) References Cited

U.S. PATENT DOCUMENTS

| 3,042,349 A | * | 7/1962 | Pirtle et al. | .................. 248/554 |
| 6,189,830 B1 | * | 2/2001 | Schnelz et al. | ............... 244/54 |
| 6,494,403 B2 | * | 12/2002 | Jule et al. | ..................... 244/54 |

FOREIGN PATENT DOCUMENTS

| WO | WO 02/49914 A1 | 6/2002 |
| WO | WO 03/074359 A1 | 9/2003 |

* cited by examiner

*Primary Examiner*—Timothy D. Collins
(74) *Attorney, Agent, or Firm*—Oblon, Spivak, McClelland, Maier & Neustadt, P.C.

(57) ABSTRACT

The invention pertains to an engine mount onto an aircraft structure comprising at least one connection means between a first and a second element such as an engine case and said structure, characterized by the fact that said connection means comprises an eccentric member housed in a bore of the first element, being rotational about a first axis, the eccentric member comprising a trunnion attached to the second element and of axis off-centred with respect to the first axis of rotation, the eccentric member being rotational about said off-centred axis.

The solution of the invention has the advantage of allowing a compact assembly.

22 Claims, 6 Drawing Sheets

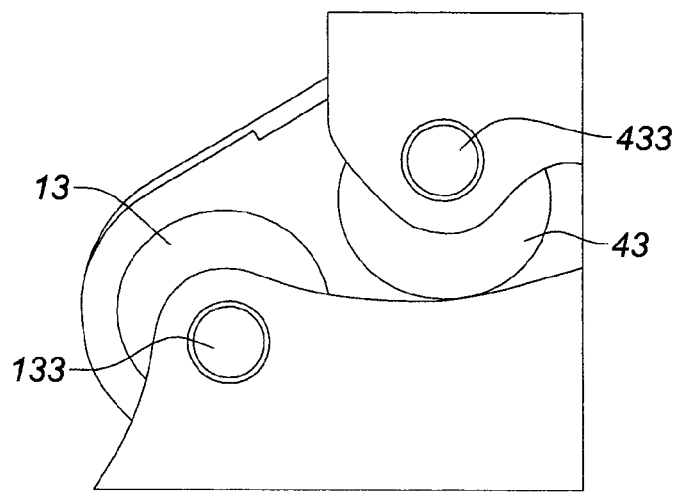
*Fig. 6A1*
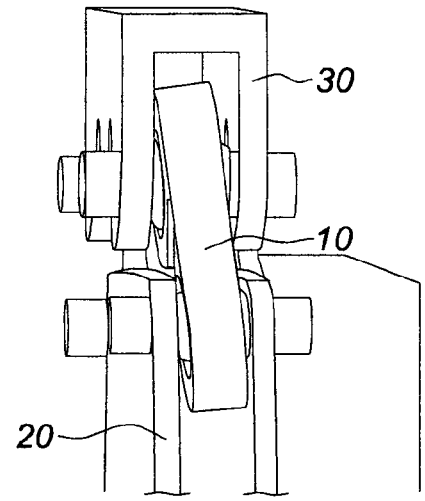
*Fig. 6A2*
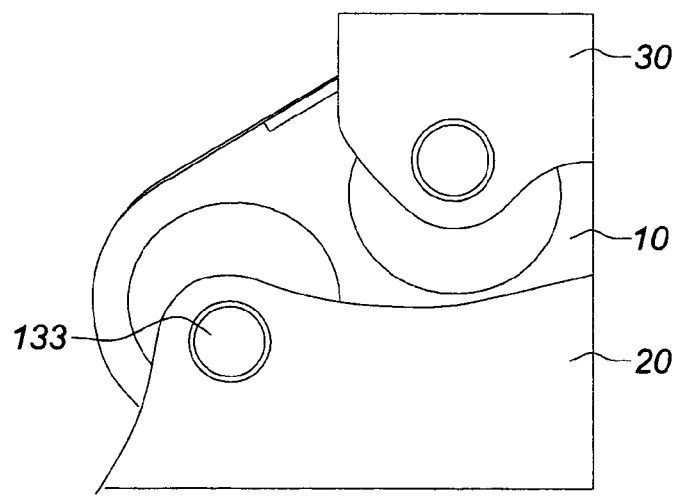
*Fig. 6B1*
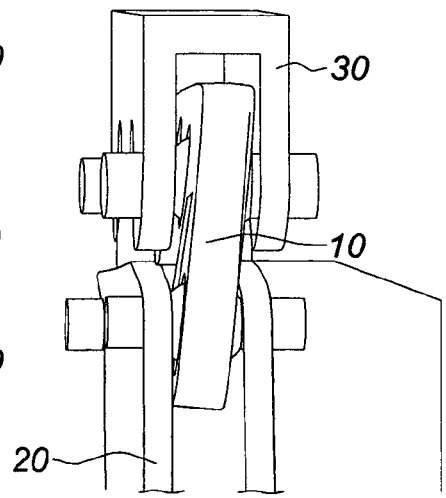
*Fig. 6B2*

MOUNTING OF ENGINE ONTO AN AIRCRAFT STRUCTURE

BACKGROUND OF THE INVENTION

1. Field of the Invention

The present invention relates to the mounting of jet engines onto an aircraft structure.

2. Description of the Related Art

A jet engine, such as a turbojet engine, may be mounted at various points of the aircraft being hung from a mast or pylon that is part of the aircraft structure. It may be mounted under the wings, attached to the fuselage, generally at the rear, or mounted in the tail unit by mounting means. The function of these mounting means is to ensure the transmission of mechanical loads between the engine and the aircraft structure. The loads to be taken into consideration are oriented along the three main directions of a reference frame related to the engine. These are the weight of the engine along the vertical axis Z, its thrust along axis X of the engine, and lateral aerodynamic loads along the transverse axis Y. The loads to be transmitted also comprise the rotational torque about the engine axis. These means must also absorb the deformations undergone by the engine during the different flight phases, without transmitting the same to the pylon, which are derived for example from dimensional variations due to thermal expansions or contractions.

The connection between the engine and the pylon is generally ensured, for turbofan jet engines, by two mounts, one forward of the engine and the other aft. Each of the mounting means is arranged to transmit part of the loads. For example, one of the mounts ensures the transmission of lateral forces along axis Y and vertical forces along axis Z, and transmission of the engine torque about axis X. The other transmits thrust and also lateral and vertical forces.

Generally a mounting means comprises a beam, optionally double, fixed to the pylon by bolts and joined to the engine case by links. These links swivel at their ends on devises or lugs, depending upon assembly, and are respectively integral with the case and beam. So that load transmission by the links is purely axial, a ball-joint bearing is provided for the cross pins, at each end of the links. With this assembly it is possible in particular to absorb radial and axial expansions of the engine. Provision is also made for connection means having a clearance, so-called standby connections, which become active when the clearance is reduced should one of the transmissions fail subsequent to failure of a part.

Patents EP 1216921 or FR 2820402 illustrate mounting modes of this type.

The beams are generally fairly massive and of complex shape. They ensure the transition between a horizontal plane of attachment to the pylon and a vertical plane comprising devises for connection to the engine. For wing mounting the height dimension of the beams depends upon the space that needs to be reserved for the attachment bolts to the pylon.

Also, a sufficient space must be set aside between the case and the beam to house the links and allow them free movement.

The attachment of the engines on some parts of the aircraft, for example on the wings, requires that the volume taken up by the mount should be as small as possible since the available space is fairly limited.

SUMMARY OF THE INVENTION

The applicant has therefore set itself the objective of developing a mount whose height is lower than is known in the prior art.

A further objective of the invention is to provide a mount consisting of parts whose shapes are simple and whose manufacture is relatively low-cost.

A still further objective of the invention is to provide a mount integrating failsafe means ensuring load transmission in the event of partial failure of a part.

According to the invention it is possible to attain these objectives with an engine mount for an aircraft structure comprising at least one connection means between a first and a second element such as an engine case and said structure, characterized by the fact that said connection means comprises an eccentric member housed in a bore of the first element and being rotational about a first axis, the eccentric member comprising a trunnion attached to the second element and having an off-centre axis relative to the first axis of rotation, the eccentric member being rotational about said off-centre axis.

The first or second element may also be a beam or any other intermediate part between the case and the structure.

The eccentric member is in the shape of a disc for example mounted via a bearing in the bore, and preferably the trunnion is mounted on the disc.

The mount that is the subject of the claim may be applied both to the forward part of the engine and to the aft part. By replacing the link rod connection between the two elements by a connection with a member of eccentric type, it is possible to achieve a more compact assembly since the connection, with its at least two degrees of freedom, can be housed within the contour of one of the elements. In this way, the height dimension of the mount is reduced by several centimetres without losing out on radial mobility. The ground clearance of the rotating assembly can be increased, or a space may be reserved for positioning shock-absorbing elastomers.

This new connection means may be widely applied.

According to one embodiment, the invention is applied to the connection between the engine case and a beam. The connection means comprises at least one eccentric member and a pin distant from said eccentric member swivelling between the case and the beam. In this manner the transmission of vertical and lateral loads is ensured and the transmission of engine torque, while allowing free expansion of the engine case.

According to one variant of this embodiment, the connection means comprises at least one first and one second eccentric members. Preferably, it comprises three thereof in this embodiment for transmission of engine torque. Said connection then finds advantageous application as a forward engine mount between the aircraft structure and the intermediate case, or an aft mount.

According to a further characteristic, the means of the invention form a connection between the beam and the aircraft structure. It comprises a structural eccentric member and a pin distant from said structural eccentric member swivelling between the beam and the structure. As in the preceding solution for the connection between the case and the beam, this connection means enables both the transmission of vertical and lateral loads and the transmission of engine torque, while allowing radial dimensional variations between the beam and the aircraft structure.

According to one variant, the connection means between the beam and aircraft structure comprise at least one first and one second structural eccentric members.

In this embodiment, the mounting of the engine to the aircraft structure preferably comprises a connection means between the case and the beam and a connection means between the beam and the structure.

Advantageously, the disc of at least one of said eccentric members is mounted in its housing on the element by means of a bearing forming a ball-joint, or else the trunnion with off-centre axis of at least one of the discs is mounted in the eccentric member by the bearing means forming a ball-joint. Preferably, at least one of said distant pins is also mounted in its housing by means of a bearing forming a ball-joint.

This ball-joint function is obtained for example by mounting the trunnion on its eccentric member in a bearing housed in a retainer having a spherical surface and forming a ball-joint, as is known to persons skilled in the art. This ball-joint function may also be obtained by mounting the eccentric member in a bearing with spherical surface.

According to one particular embodiment, a double ball-joint function is imparted to the eccentric member by providing a ball-joint both for the trunnion pin and for the rotating disc. In this way freedom of rotation is ensured over a wide angle.

Preferably, the distant pin is also mounted in a bearing forming a ball-joint. With this embodiment, it is possible to absorb axial expansions or contractions of the case during transitory operating phases of the engine. In particular, in the first embodiment, through the similar arrangement of the beam with the engine structure, it is made possible through the combined movements of the beam relative to the engine case and of the beam relative to the aircraft structure, to absorb efficiently the axial expansions or movements of the engine with respect to the aircraft structure.

Further preferably, it is provided that one of the pins or trunnions is able to slide with respect to one of the elements: case, beam or structure. In this way it is ensured that the loads involving rotation of the engine case about the vertical axis Z are not transmitted, and a fully isostatic assembly is provided.

According to a further characteristic, the mount comprises a first standby connection member between the beam and the engine case, arranged between the first and second trunnions.

According to a further characteristic the mount comprises a second and a third standby connection member between the beam and the aircraft structure.

Preferably, the standby connection members are formed by a trunnion housed in a bore with a set clearance. According to one embodiment, at least one of the pins or trunnions is mounted in its bearing being axially mobile.

BRIEF DESCRIPTION OF THE DRAWINGS

Other characteristics and advantages will become apparent on reading the following description of a non-restrictive embodiment of the invention, accompanied by the drawings in which:

FIGS. 6A1 and 6B1 show a front view of part of the mount according to the first embodiment in cold engine and hot engine position, FIGS. 6A2 and 6B2 show a side view of the mount according to the first embodiment in cold engine and hot engine position, FIG. 7 gives a perspective view of a second embodiment of the invention.

DETAILED DESCRIPTION OF THE PREFERRED EMBODIMENTS

Figure 1:
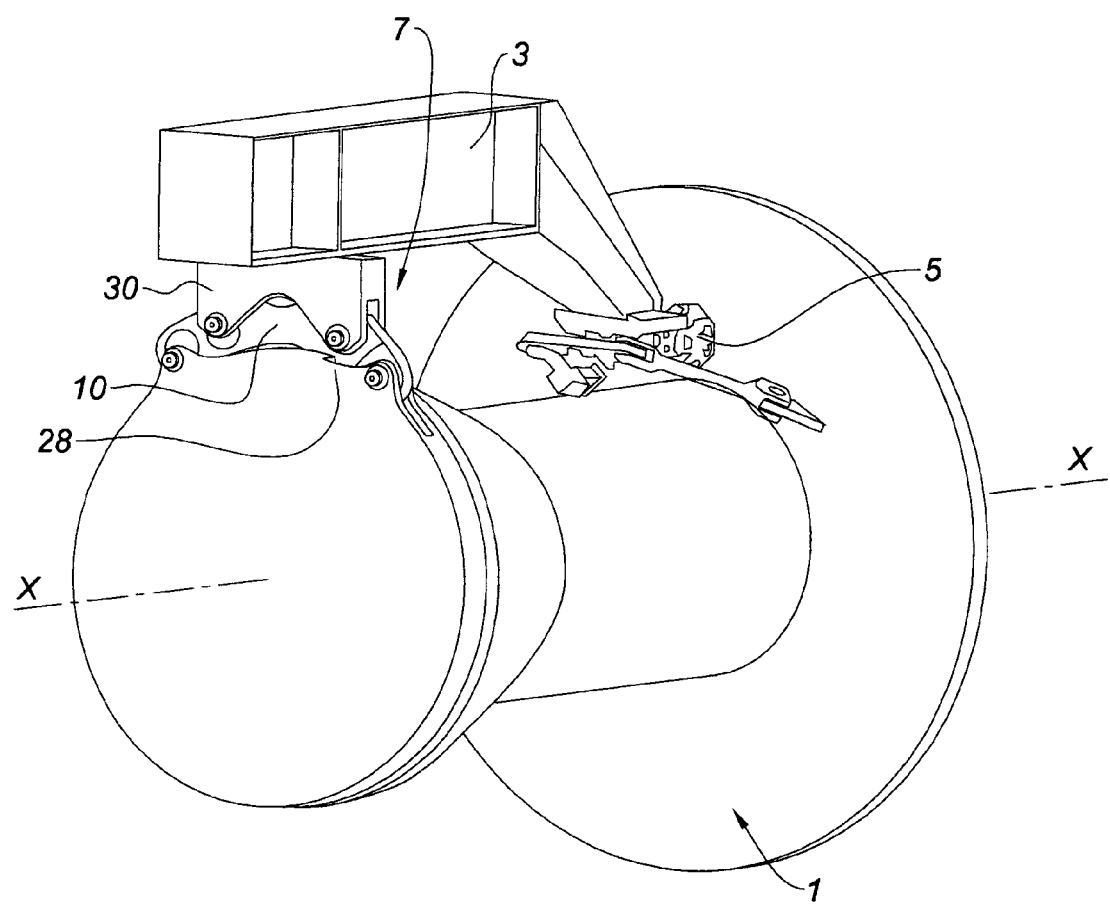
FIG. 1 shows an engine mount attached to an aircraft pylon with its forward and aft attachments.

FIG. 1 very schematically shows a turbojet engine 1 mounted on a pylon 3 which is part of the wing structure of the aircraft and is not visible. The mount generally comprises a forward attachment 5 at the intermediate fan case, and an aft attachment 7 at the exhaust case. Both cases are structural elements of the engine through which mechanical loads transit between the aircraft structure and the engine.

The invention such as illustrated in the description of the first embodiment given below is applied to the aft attachment, but it could also be applied to the forward or other attachment.

Mount 7 comprises a beam 10 positioned transverse to axis X of engine 1 between the annular frame 20, that is here integral with the turbine case, and the base 30 of the pylon.

A more detailed description will now be given of the mount with reference to FIGS. 2 to 5. The beam 10 here is in the general shape of an arc of a circle with attachment means to the annular frame of case 20 which itself is in the shape of an arc of a circle and perpendicular to the engine axis. This annular frame forms two radial devises 21 and 23 spaced apart on the arc of a circle with bores and bearings to receive two trunnions or pins. The connection means of a first element such as the beam 10 to a second element such as the case 20 comprises an eccentric member 13 at one end of the beam 10 and a pin 11 at the opposite end. As can be seen in more detail in FIG. 3, the eccentric member 13 consists of a disc 131 housed in a bore provided in the beam 10 and having a rotational axis 131A.

In this embodiment, the disc is rotationally mounted about the sole rotational axis 131A perpendicular to its plane. This disc may also, in one variant such as shown FIGS. 7 to 9, be mounted so as to form a ball-joint.

Also the disc is shown to be solid; however, it may be of any other shape, all that is required is that it should be housed in a bore provided in the beam 10.

On this disc 131, a trunnion pin 133 is mounted of axis 133A off-centred with respect to axis 131A, via a bearing 134 forming a ball-joint and housed in a retainer 135. The external surface of the bearing 134 is spherical enabling the trunnion 133 to pivot and tilt at a certain angle with respect to the plane of the disc 131. The trunnion 133 crosses through the two branches of the clevis 23 in which it is supported by bearings 123. In operation, axis 131A may rotate about axis 133A, and axis 133A may rotate about axis 131A.

On the opposite side of beam 10, a pin 11 is swivel-mounted in the beam and the two branches of the clevis 21. Advantageously, the pin 11 is housed in a bearing 11R whose outer surface is spherical to enable pin 11 to rotate about itself around its rotational axis 11A. The rotational axis 11A through the ball-joint is able to tilt at a certain angle with respect to the plane of the beam 10.

Figure 2:
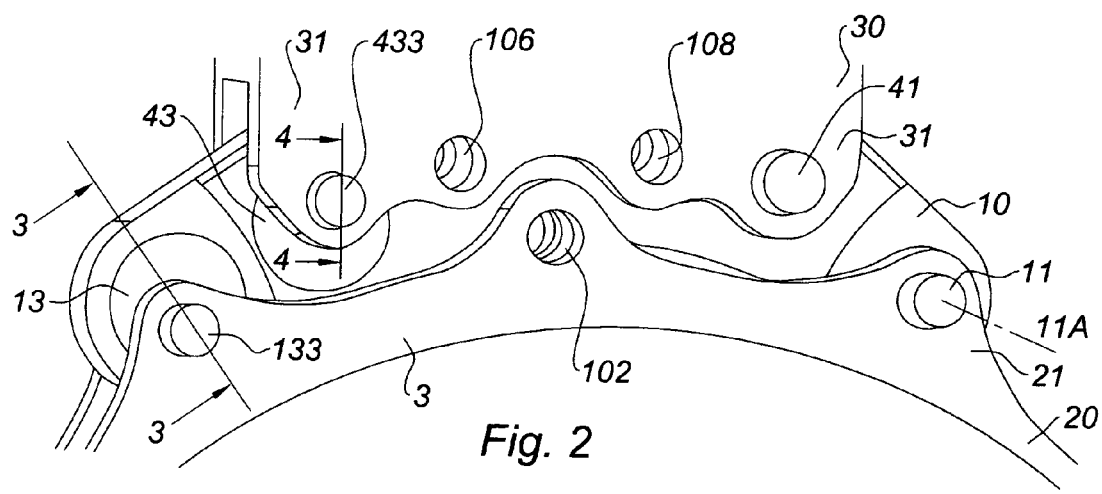
FIG. 2 shows a mount according to a first embodiment of the invention.

It can be seen in FIG. 2 that the mount comprises a connection means for the beam to the aircraft structure 30 also formed by an eccentric member 43 on one side of the beam and by a pin 41 on the other end of the beam 10.

The eccentric member 43 is formed of a disc 431 mounted in a cylindrical housing of axis 431A. Like member 13 it is rotationally mounted about the sole axis 431A but in another embodiment it may be swivel mounted. The disc comprises a trunnion 433 of axis 433A off-centred with respect to axis 431A. Axis 433A rotates about rotational axis 431A of disc 431.

The trunnion 433 is supported in disc 431 by a bearing with a spherical outer surface 434 via a retainer 435.

The distant pin 41, like distant pin 11, swivels through clevis 31 and is mounted on the beam via a bearing forming a ball-joint 41R.

To meet safety constraints in the event of partial failure of a part, the solution makes it possible to provide standby connection members. As can be seen in FIG. 2, a first standby connection member 101 consists of a trunnion which is housed in a bore passing through a central clevis 24 of annular frame 20 and the beam 10 with a set clearance. For reasons related to clarity of the drawing the trunnion is not shown. Only the bore 102 can be seen in which it is housed. In normal operation, the trunnion is not subjected to any load on account of the clearance.

Similarly, a second and a third standby connection member 105 and 107 are arranged on the annular frame 30 of the aircraft structure. The two members consist of two trunnions housed in two bores 106 and 108 with a set clearance either side of the vertical plane in which the member 101 is located, passing through the annular frame 30 and the beam that is housed between the two branches of the clevis. The two trunnions are not shown.

Figure 5:
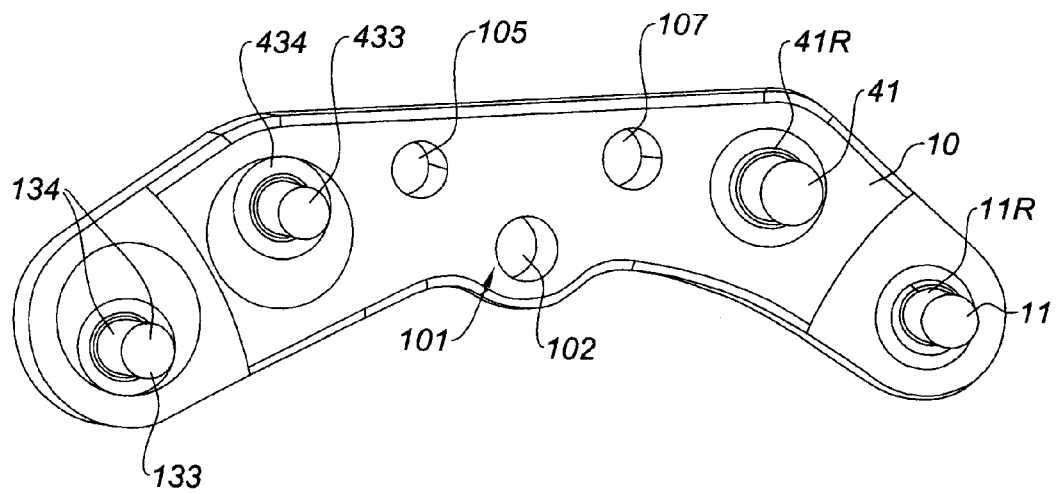
FIG. 5 shows just the beam of the mount according to the first embodiment of the invention.
Figure 4:
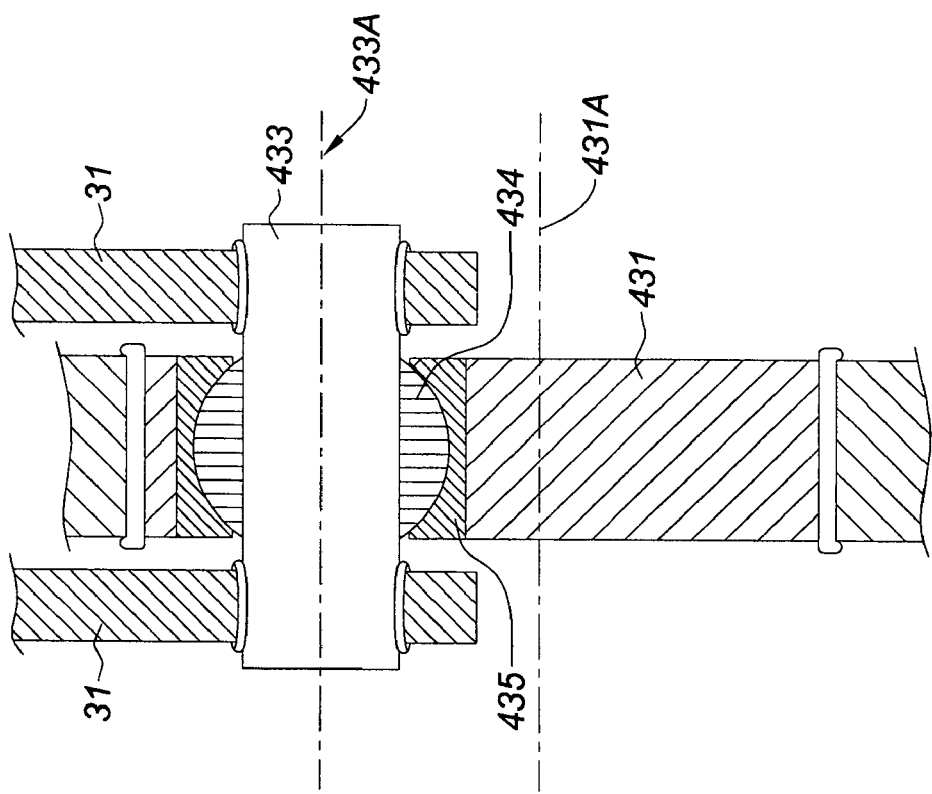
FIG. 4 shows a cross-section of FIG. 2 along direction 4-4.
Figure 3:
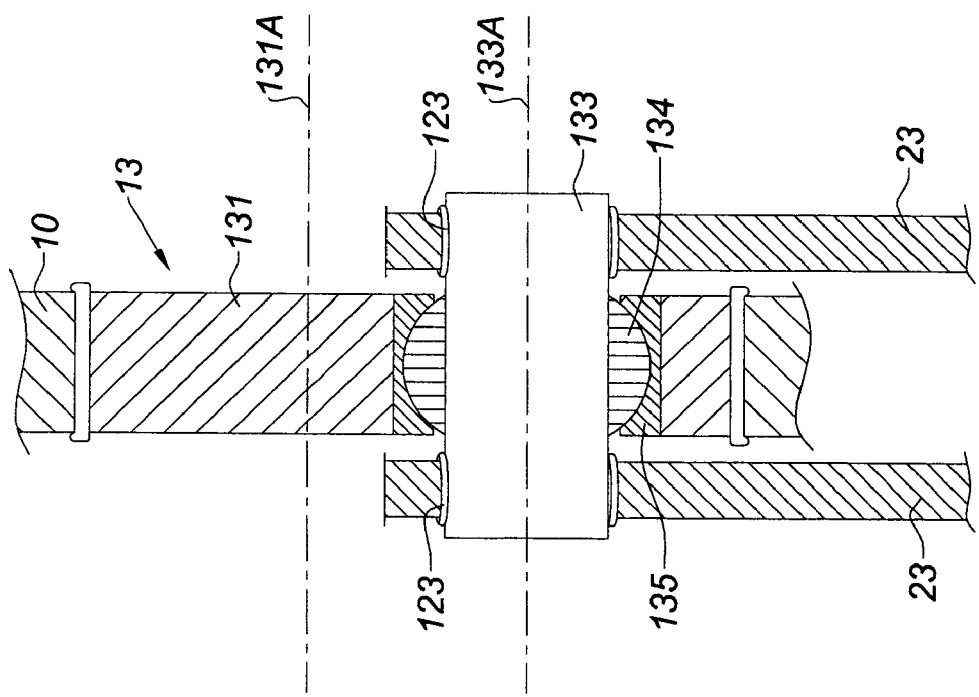
FIG. 3 shows a cross-section view of FIG. 2 along direction 3-3.

FIG. 5 shows the beam alone fitted with its eccentric members 13 and 43, and with the respective distant pins 11 and 41. The trunnions 133, 433 and the pins 11 and 41 are mounted on the discs and respectively the beam via spherical surface bearings 134, 434, 41R and 11R to form ball-joints.

A description is now given of the relative positioning of the parts in two different phases of engine operation.

In FIG. 6A1 the engine is cold, the left end of the mount shows the two eccentric members 13 and 43 with their eccentric trunnions 133 and 433. In FIG. 6A2 which is a side view of the mount, the beam inclines towards the left. Tilting of the beam makes it possible to maintain an isostatic connection between the case 20 and the aircraft structure 30; this tilting is made possible by the two ball-joints.

In FIG. 6B1, which corresponds to the situation when the engine is very hot, in a transitory engine operating phase, the eccentric member 133 with its trunnion has rotated to adapt to expansion of the case 20. At the same time, the engine has become elongated and cambered. The beam then occupies the position seen in FIG. 6B1. It can be seen that the annular frame 20 has shifted leftwards with respect to structure 30.

The failsafe system functions as follows.

Failure of the trunnion 133 or pin 11 imposes partial rotation about pin 11 or trunnion 133 respectively, and reduces the clearance in the standby connection member 101. Loads are then transmitted via this newly active connection.

Failure of the pin 41 on the structure side imposes rotation and reduced clearance in the standby connection member 107. Transmission of loads passes through the newly active connection 107 and connection 433 is undamaged. Transmission is symmetrical in the event of a failure at the connection by the eccentric member 433.

The invention is not limited to this embodiment such as described. It is possible, for example, to position the ball-joint assembly not on the off-centred trunnion but on the disc itself of the eccentric member.

It is also possible, especially if the tilt angle between the two end positions of the beam is not too great, to make provision for a double ball-joint for the eccentric member.

A second embodiment is now described of a mount incorporating eccentric members.

Figure 7:
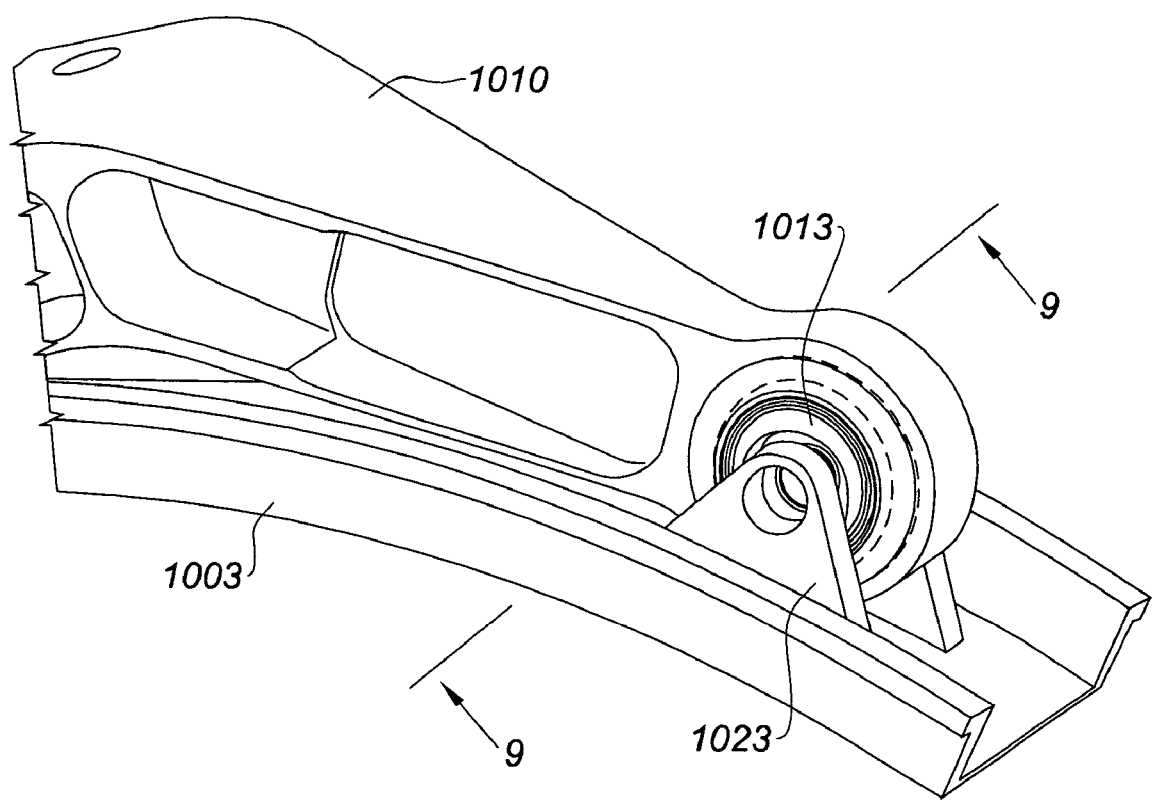
Figure 8:
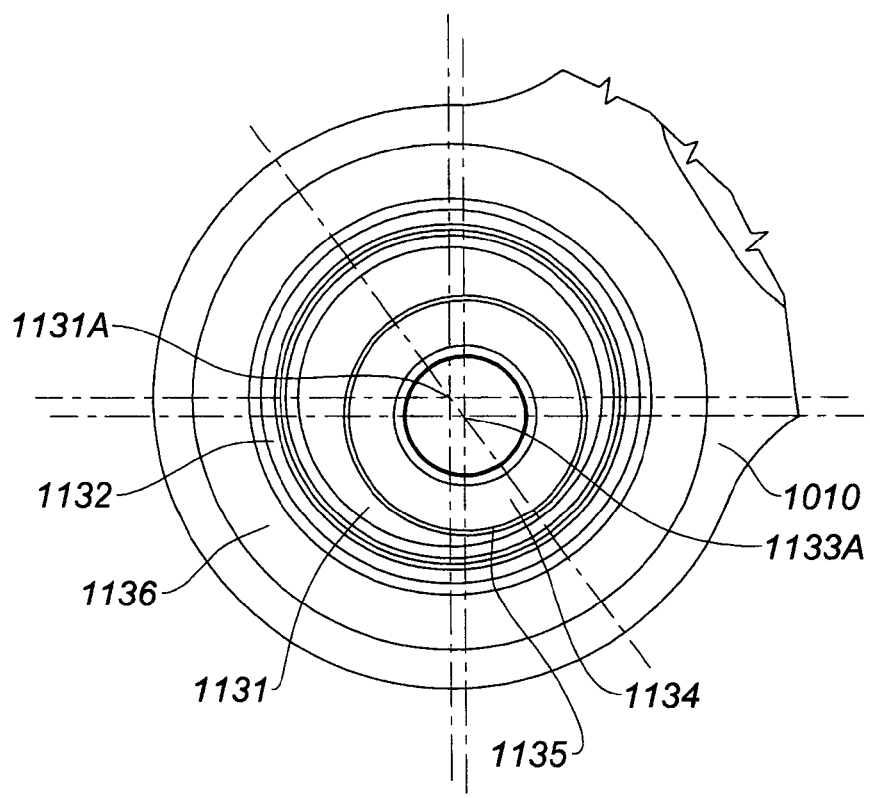
FIG. 8 is a front view of the eccentric member in FIG. 7.
Figure 9:
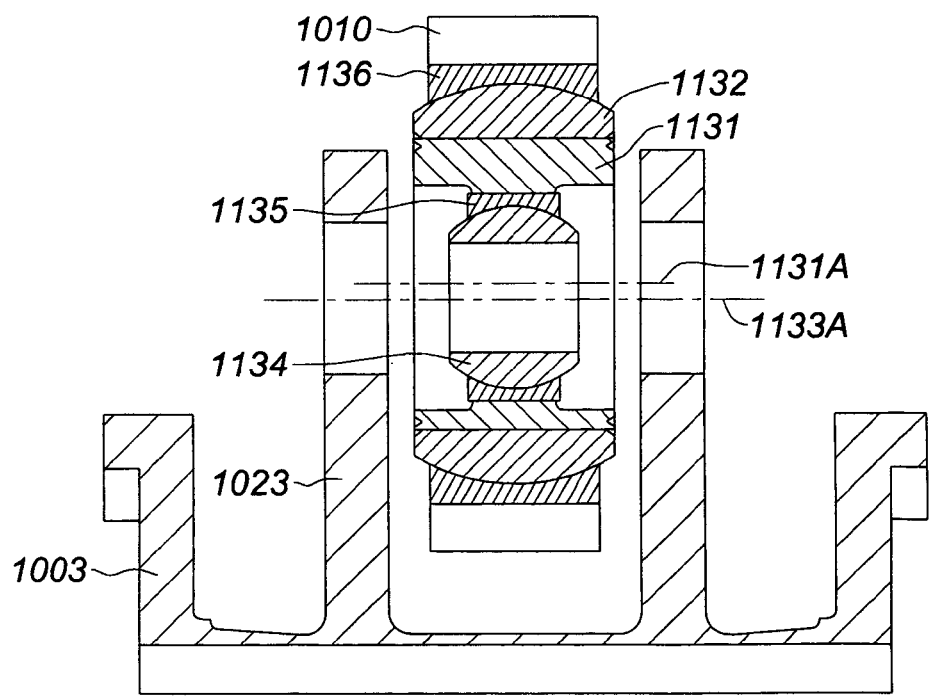
FIG. 9 is a cross-section of FIG. 7 along direction 9-9.

This concerns the forward mount of a turbofan jet engine for example. As can be seen in FIGS. 7, 8 and 9 an intermediate cross piece in the form of a beam or hanger 1010 is made integral with the aircraft structure, a pylon for example that is not shown, using appropriate attachment means. This first element 1010 is joined to a second element 1003, the intermediate case for example, by a connection means that here consists of an eccentric member 1013 at each end. The member 1013 is mounted on one side on element 1010 and on the other side on element 1003 via a trunnion which is not shown for reasons of figure clarity. The trunnion is mounted on the branches of a clevis 1023 that is part of the case.

The eccentric member comprises a disc 1131 of axis 1131A swivel-mounted in a bore of element 1010 via a bearing with spherical surface 1132 housed in a retainer 1136 that is integral with the bore. On this disc 1131 a ball-joint is mounted of axis 1133A with a spherical bearing 1134 housed in a retainer 1135 that is integral with a bore of disc 1131. The two axes 1131A and 1133A are separate. The trunnion of axis 1133A, which is not shown, passes through the two branches of clevis 1023.

Said eccentric member may comprises means such as a groove enabling dismounting of a ball-joint head for maintenance.

This arrangement is equivalent to a link rod connection insofar as it is arranged so as to transmit loads in one direction only. This property is reproduced in this assembly with eccentric members. The first advantage with respect to links is the compactness of the connection. In addition it offers a weight gain.

This type of connection makes it possible to absorb variations due to thermal expansions and to make up for differences due to manufacturing tolerances.

The invention claimed is:

1. An engine mount for an aircraft structure, comprising at least one connection device configured to connect a first element to a second element, said first and second elements being between an engine case and said aircraft structure, wherein said connection device comprises:
   a first eccentric member housed in a first bore of the first element, said first eccentric member being rotational about a first eccentric member axis, and
   a first pivot pin passing through said first eccentric member via a first ball joint, said first pivot pin being attached to the second element, said first pivot pin having a first pivot pin axis offset with respect to the first eccentric member axis, the first eccentric member being rotational about said first pivot pin axis.

2. The engine mount as in claim 1, wherein the first or second element is a beam or any other intermediate part between the engine case and the structure.

3. The engine mount as in claim 1, wherein the first eccentric member is in the form of a disc.

4. The engine mount Mount as in claim 3, wherein the first pivot pin is mounted on the disc.

5. The engine mount as in claim 1 wherein the first eccentric member is mounted in said first bore of said first element via a second ball-joint.

6. The engine mount as in claim 2, wherein the first element is a beam between the engine case and the aircraft structure, and the second element is an annular frame of the engine case, the connection device further comprising a pin distant from said first eccentric member, said pin being configured to swivel between the beam and the annular frame of the engine case.

7. The engine mount as in claim 2 wherein the first element is a beam between the engine case and the aircraft structure, and the second element is an annular frame of the engine case, the connection device further comprising a second eccentric member with a second eccentric member axis, and a second pivot pin passing through said second eccentric member and having a second pivot pin axis offset from said second eccentric member axis and offset from said first pivot pin axis.

8. The engine mount as in claim 2 wherein the first element is a beam between the engine case and the aircraft structure, and the second element is said aircraft structure, the connection device further comprising a a pin distant from said first eccentric member, said pin being configured to swivel between the beam and the aircraft structure.

9. The engine mount as in claim 2 wherein the first element is a beam between the engine case and the aircraft structure, and the second element is the aircraft structure, the connection device further comprising a second eccentric member with a second eccentric member axis, and a second pivot pin passing through said second eccentric member and having a second pivot pin axis offset from said second eccentric member axis and offset from said first pivot pin axis.

10. The engine mount as in claim 2 wherein the first element is an intermediate part arranged crosswise between the engine case and the aircraft structure, and the second element is an annular frame integral with the engine case, wherein said first eccentric member is arranged at a first transverse end of said intermediate part, the connection device further comprising second eccentric member arranged at a second transverse end of said intermediate part, wherein said first and second transverse ends are opposite each other.

11. The engine mount as in claim 6, wherein said distant pin is mounted in its housing by a ball-joint.

12. The engine mount as in claim 1, further comprising at least one standby connection member between said first element and said second element.

13. The engine mount as in claim 12, further comprising a second standby connection member and a third standby connection member, each positioned between the engine case and the aircraft structure and each arranged on either side of a median vertical plane for said engine mount.

14. The engine mount as in claim 12, wherein said at least one standby connection member is formed by a pin housed in a bore with a set clearance.

15. The engine mount as in claim 6, wherein said pin distant from said first eccentric member is mounted in its bearing and is axially mobile.

16. The engine mount as in claim 1, wherein said first ball joint is housed in a bore of said first eccentric member, and wherein said first eccentric member axis does not pass through said bore of said first eccentric member.

17. The engine mount as in claim 1, wherein said first element defines a second bore and said connection device further comprises:

a second eccentric member housed in said second bore, said second eccentric member being rotational about a second eccentric member axis; and a second pivot pin passing through said second eccentric member via a second ball joint, said second pivot pin being attached to said aircraft structure, said second pivot pin having a second pivot pin axis offset with respect to the second eccentric member axis, wherein said first pivot pin axis is offset with respect to said second pivot pin axis, and said first eccentric member axis is offset with respect to said second eccentric member axis.

18. The engine mount as in claim 17, wherein:

said first ball joint is housed in a bore of said first eccentric member, and said first eccentric member axis does not pass through said bore of said first eccentric member, and said second ball joint is housed in a bore of said second eccentric member, and said second eccentric member axis does not pass through said bore of said second eccentric member.

19. The engine mount as in claim 17, wherein said first and second bores defined by said first element do not overlap with each other.

20. The engine mount as in claim 17, wherein:

said first eccentric member axis and said first pivot pin axis do not pass through said second bore defined by said first element, and said second eccentric member axis and said second pivot pin axis do not pass through said first bore defined by said first element.

21. The engine mount as in claim 17, wherein:

said first eccentric member axis and said second eccentric member axis are not coincident with each other, and said first pivot pin axis and said second pivot pin axis are not coincident with each other.

22. The engine mount as in claim 17, wherein:

the first element is an intermediate part arranged crosswise between the engine case and the aircraft structure, wherein said first eccentric member is arranged at a first transverse end of said intermediate part, said connection device further comprising a pin arranged at a second transverse end of said intermediate part, wherein said first and second transverse ends are opposite each other, said pin being configured to swivel between the intermediate part and the engine case, and said second eccentric member is arranged between said first and second transverse ends of said intermediate part.

* * * * *